United States Patent [19]

Carter et al.

[11] Patent Number: 5,058,607

[45] Date of Patent: Oct. 22, 1991

[54] USE OF REACTIVE HOT MELT ADHESIVE FOR MANUFACTURE OF CIGARETTE FILTERS

[75] Inventors: David G. Carter, Chorleywood; Derek J. Green, Langley; Michael C. Collins, High Wycombe, all of England

[73] Assignee: National Starch and Chemical Investment Holding Corporation, Wilmington, Del.

[21] Appl. No.: 485,006

[22] Filed: Feb. 23, 1990

[51] Int. Cl.$^5$ .......................... A24D 1/02; A24D 3/02
[52] U.S. Cl. ........................................ 131/58; 131/67; 131/68; 131/69; 131/90; 131/84.1; 493/39; 493/49
[58] Field of Search ................... 131/84.1, 58, 67, 68, 131/69, 90; 493/41, 49, 39

[56] References Cited

U.S. PATENT DOCUMENTS

| | | |
|---|---|---|
| 3,931,077 | 1/1976 | Uchigaki et al. . |
| 3,939,849 | 2/1976 | Baxter et al. . |
| 3,968,089 | 7/1976 | Cuscurida et al. . |
| 4,104,431 | 8/1978 | Luke . |
| 4,221,226 | 9/1980 | Kiefer et al. . |
| 4,232,130 | 11/1980 | Baxter et al. . |
| 4,265,255 | 5/1981 | Helms . |
| 4,279,848 | 7/1981 | Baxter et al. . |
| 4,295,478 | 10/1981 | Yeatts . |
| 4,326,543 | 4/1982 | Martin et al. . |
| 4,411,279 | 10/1983 | Martin et al. . |
| 4,427,744 | 1/1984 | Hume, III . |
| 4,775,719 | 10/1988 | Markevka et al. . |
| 4,780,988 | 11/1988 | Mielke et al. . |
| 4,808,255 | 2/1989 | Markevka et al. . |

FOREIGN PATENT DOCUMENTS

| | | |
|---|---|---|
| 0118171 | 9/1984 | European Pat. Off. . |
| 0232055 | 8/1987 | European Pat. Off. . |
| 0246473 | 11/1987 | European Pat. Off. . |
| 2137638 | 10/1984 | United Kingdom . |

*Primary Examiner*—V. Millin
*Attorney, Agent, or Firm*—Ellen T. Dec; Edwin M. Szala

[57] ABSTRACT

The plug wrap paper used to form cigarette filters is bonded using a specific class of low viscosity reactive urethane hot melt adhesive compositions which provide a fast setting, temperature resistant bond that is not attacked by aromatic oils solvents or petrochemical vapors.

7 Claims, No Drawings

USE OF REACTIVE HOT MELT ADHESIVE FOR MANUFACTURE OF CIGARETTE FILTERS

BACKGROUND OF THE INVENTION

The present invention is directed to the use of polyurethane based hot melt adhesives for bonding the paper which wraps the filter element of a cigarette and to cigarette filter elements bonded therewith.

A standard filter tipped cigarette is produced by three different operations: (1) filter or plug manufacture, (2) rod manufacture and (3) tipping.

The cigarette rod consists of a stream of tobacco wrapped in a paper tube, the paper tube being glued along one longitudinal edge with a suitable adhesive. This operation takes place at speeds varying from 2000–12000 cigarettes per minute. The weight of the cigarette rod, diameter, and length are all closely monitored for both cost control and tax reasons.

The filter making operation is similar in many respects to the rod manufacture, but the materials used are different. Tobacco smoke filters are most commonly manufactured from a crimped textile tow of cellulose acetate fibers. The tow is then warmed and rolled to produce a material about 9" wide, and containing an even distribution of fibres. The tow is "bloomed" in a known manner to separate the fibers, and a high boiling solvent, commonly called a "plasticizer", is applied by spraying, wicking, or other suitable means. The treated tow is then pulled into a cylindrical form and wrapped with paper. During an interval of time, which can be accelerated by heating, the plasticizer first partially dissolves the surface of the fibers causing them to become sticky and to bond together at points of contact with each other. The plasticizer then migrates into the fiber leaving the surface dry, but the fibers still remain bonded.

The bloomed tow is then formed into a tube, and wrapped in paper or plugwrap, the paper being glued along one longitudinal edge. Because of the nature of the tow, there is a high degree of radial stress upon the glued bond, so any adhesive used, must be able to stick almost instantly, and hold indefinitely. This has led to the use of hot melt type adhesives, which by formulation are fast setting, and allow very high machine speeds to be used.

However, the plasticizers used in the blooming operation attack hot melts, acting as a solvent for the hot melt. This attack on the hot melt reduces the shelf life of the finished plug to a matter of weeks. In practice, this means that cigarette companies are unable to produce plugs for stock, and so work very much on a "made today-use tomorrow" basis. This lack of stock can lead to (1) poor machine maintenance of the plug makers, leading to shorter machine life; (2) insufficient plugs for producing cigarettes; and/or (3) wrong tips or specification plugs, again with machine downtime.

Furthermore, use of plugs which have been stored for any appreciable length of time could cause excessive machine downtime caused by blockages in the production process since the plugs are fed along narrow pipes and if the plug comes apart, the pipe is blocked. Even if the cigarettes can be assembled using these plugs, the results will be poor quality cigarettes.

SUMMARY OF THE INVENTION

The present invention is directed to the use of a specific class of polyurethane based reactive hot melt adhesives for manufacturing cigarette filters and bonding of plug wrap materials. The particular adhesive has a suitable viscosity while in the molten state, but has very good adhesion to cigarette plug wrap papers and to tobacco smoke filter elements. The filaments and plug wrap paper can thus be bonded with the adhesive so as to produce a bond which is resistant to effects of oils, solvents, heat, and the petrochemical vapors generated in the storage and use of the cigarettes.

The specific hot melt adhesives for use herein are prepared by the addition of urethane prepolymers to low molecular weight polymers formed from ethylenically unsaturated monomers which do not contain active hydrogen, the adhesives being solid at room temperature and coatable at a viscosity of 3000 to 50,000 cps. at 120° C. without the need for additional tackifiers or plasticizers. Adhesives for use herein are disclosed in copending U.S. patent application Ser. No. 200,092, filed May 27, 1988, the disclosure of which is incorporated herein by reference.

In addition, we have found that the heat resistance of the latter class of hot melt adhesives may be even further improved by utilizing an ethylenically unsaturated monomer which contains moisture reactive functional (crosslinking) groups. The resultant hot melt adhesive, upon curing, produces an adhesive consisting of a crosslinked polyurethane and a crosslinked ethylenically unsaturated polymer, i.e., a fully inter-penetrating network (IPN) adhesive.

The adhesive may be applied to the plug wrap paper by any convenient method, for example, using a heated nozzle, or by direct application via a narrow wheel or roller. The application may be carried out on any type of cigarette plug making machine currently in use. The plug wrap bond is made while the adhesive is molten and held in compression until sufficient bond strength has developed to prevent bond movement. Typical application temperatures of the adhesive are 120° C., at which point the viscosity will be suitable for good flow and low bleed through.

The tobacco smoke filter element disclosed herein may therefore be comprised of filamentary tow selected from filaments of cellulose acetate, poly(ethylene terephthalate), polypropylene and polyethylene, the filaments being bonded together into a filter element and the element then wrapped in plugwrap, at least one longitudinal edge thereof coated with the previously described hot melt adhesive.

Detailed Description of The Preferred Embodiments

In accordance with the general procedure for preparing adhesives suitable for use herein, the low molecular weight polymer may be added to a polyol component prior to reaction with the isocyanate components or it may be added to the already formed prepolymer. Suitable adhesives may also be formed through the simultaneous polymerization of the urethane prepolymer and the ethylenically unsaturated monomers. The polyurethane prepolymer may also be polymerized in the ethylenically unsaturated monomers, which are then subsequently polymerized to form the adhesive. Alternatively, if a polyol is used to form the prepolymer, the ethylenically unsaturated monomers may be polymerized in the polyol using free radical polymerization procedures. In this case, the isocyanate components are subsequently polymerized with the mixture using conventional condensation polymerization procedures.

This latter polymerization procedure has the advantage of excellent control of the molecular weight of the resulting vinyl polymer (as determined by intrinsic viscosity) and also produces a polymer which is free of detrimental impurities. In addition, the reduction in the handling and inventory of materials and elimination of intermediate packaging and storage bring about significant cost savings.

In the specific embodiment wherein an ethylenically unsaturated monomer containing moisture reactive functional groups is employed, the reactive nature of the crosslinking monomer requires that the monomer be added after the prepolymer has been formed. Thus, in this embodiment, the (co)polymer may be added in its polymerized form to the already formed prepolymer. Alternatively, and more preferably, the monomer or monomers are added to the already formed polyurethane prepolymer and polymerized therein using free radical polymerization procedures.

Any ethylenically unsaturated monomer capable of free radical polymerization and which does not contain active hydrogen may be used herein. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc. may be used as may comonomers thereof.

When the ethylenically unsaturated monomer contains moisture reactive functional groups, any such monomer containing moisture reactive (curable) functional groups may be employed. In particular, monomers containing silane or reactive isocyanate functionality are particularly useful herein.

Typical of useful silane or isocyanate containing ethylenically unsaturated copolymers are those which contain only mers derived from an ethylenically unsaturated monomer containing silane or isocyanate functional groups or those which contain up to 99% by weight of mers derived from a non-silane or non-isocyanate containing ethylenically unsaturated monomer capable of free radical polymerization. Thus, the final ethylenically unsaturated silane or isocyanate containing copolymer may contain 1-100% of the polymerized ethylenically unsaturated silane or isocyanate monomer, preferably up to 50% by weight and more preferably (from an economic standpoint) 5-30% by weight. Indeed, levels of ethylenically unsaturated silane or isocyanate containing monomers in the range of 15% or less have been shown to provide potentially commercially significant results.

The ethylenically unsaturated silanes are preferably those which will participate directly in the reaction by free-radical polymerization and which do not contain active hydrogen. Representative commercially available silanes of this type include vinyltrichlorosilane, vinyltriethoxysilane, vinyltrimethoxysilane, vinyltris(2-methoxyethoxy) silane, 3-methacryloxypropyltrimethoxysilane, 3-methacryloxypropyltris(2-methoxyethoxy)silane, vinyltriacetoxysilane, 4-(3-trimethoxysilylpropyl)-benzylstyrene sulfonate, 3-acryloxypropyltrimethoxysilane, allyltriethoxysilane, allyltrimethoxysilane, vinylmethyldiethoxysilane, vinyldimethylethoxysilane, vinylmethyldiacetoxysilane, 3-methacryloxypropylmethyldiethoxysilane, 3-acryloxypropyldimethylmethoxysilane, etc.

The ethylenically unsaturated isocyanates are also preferably those which will participate directly in this reaction by free-radical polymerization and which do not contain active hydrogen. Representative commercially available isocyanates of this type include isocyanatoethyl methacrylate and m-isopropenyl-$\gamma,\gamma$-dimethylbenzyl isocyanate.

As discussed above, any ethylenically unsaturated monomer capable of free radical polymerization and which does not contain active hydrogen may be employed as a comonomer in forming the final silane or isocyanate containing copolymer. Most commonly employed are the $C_1$ to $C_{12}$ esters of acrylic and methacrylic acids including, but not limited to methyl acrylate, ethyl acrylate, n-butyl acrylate, isobutyl acrylate, n-propyl or iso-propyl acrylate as well as the corresponding methacrylates. Mixtures of compatible (meth)acrylate monomers may also be used. Such mixtures, including mixtures of butyl and methyl methacrylate are well known in the art. Additional ethylenically unsaturated monomers such as vinyl esters (e.g., vinyl acetate and vinyl propionate), vinyl ethers, fumarates, maleates, styrene, acrylonitrile, ethylene, vinyl ethers, etc. may be used as may copolymers thereof.

The urethane prepolymers are those conventionally used in the production of polyurethane hot melt adhesive compositions. Most commonly, the prepolymer is prepared by the condensation polymerization of a polyisocyanate with a polyol, most preferably the polymerization of a diisocyanate with a diol. The polyols used include polyhydroxy ethers (substituted or unsubstituted polyalkylene ether glycols or polyhydroxy polyalkylene ethers), polyhydroxy polyesters, the ethylene or propylene oxide adducts of polyols and the monosubstituted esters of glycerol.

In addition, the urethane prepolymers may be prepared by the reaction of a polyisocyanate with a polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed above. Also, small amounts of low molecular weight dihydroxy, diamino, or amino hydroxy compounds may be used such as saturated and unsaturated glycols e.g. ethylene glycol or condensates thereof such as diethylene glycol, triethylene glycol, and the like: ethylene diamine, hexamethylene diamine and the like: ethanolamine, propanolamine, N-methyldiethanolamine and the like.

Any suitable organic polyisocyanate may be used such as, for example, ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'- diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4''-triisocyanato-triphenylmethane, 1,3,5-triisocyanato-benzene, 2,4,6-triisocyanato-toluene, 4,4'-dimethyldiphenylmethane-2,2',5,5-tetraisocyanate, and the like.

The polyisocyanate and polyol, polyamino or polymercapto components are combined in proportions so as to yield a urethane prepolymer characterized by an isocyanate content of from about 0.25 to about 15%, preferably to about 10%, and most preferably from 1.5 to 5%. In addition, the ratio of isocyanate equivalents to hydroxyl, amino or mercapto equivalents (known as the isocyanate index) should be greater than 1 but no more than about 2. By maintaining the low isocyanate index, we are able to reduce the level of free isocyanate content in the final hot melt adhesive composition to less than about 4%, preferably less than 1%. It will be recognized that the presence of higher levels of free isocyanate has a detrimental effect on a hot melt formulation since it causes toxic fumes to be released when the adhesive is heated to application temperature. The higher levels of free isocyanate may also cause reduction in viscosity and poorer initial bond strength of the adhesive. The precise amount of the polyisocyanate used in the polymerization will depend on the equivalent weight and amount of the non-isocyanate components, and the particular polyisocyanate employed. In general, the amount of the polyisocyanate needed to achieve the isocyanate content will vary from about 5 to about 55% of the final prepolymer.

In the broadest sense, the ethylenically unsaturated monomer may be polymerized using conventional free radical polymerization procedures to a relatively low molecular weight. For purposes of clarification herein, by "low molecular weight" we mean weight average molecular weights in the range of approximately 10,000 to 30,000. The low molecular weight is obtained by careful monitoring and controlling the reaction conditions and, generally, by carrying out the reaction in the presence of a chain transfer agent such as dodecyl mercaptan. There is a recognized correlation between intrinsic viscosity and molecular weight and we have found that, in general, monomers polymerized to an intrinsic viscosity of 0.1 to 0.4 (I.V. as measured in a 9:1 mixture of tetrahydrofuran and alcohol) are particularly preferred for use herein. In this embodiment, the low molecular weight polymer is then blended either with the polyol and dissolved therein prior to reaction with the isocyanate component or the low molecular weight polymer is dissolved in the already formed urethane prepolymer. In the case of polyamino or polymercapto containing prepolymers, in-situ vinylic polymerization must be performed only in the pre-formed prepolymer. In either case, low molecular weight polymer is combined with the isocyanate terminated urethane prepolymer in a proportion such that the reactive curing hot melt adhesive contains about 5 to 90% of the urethane prepolymer and 95% to 10% of the low molecular weight polymer. Care should be taken in storing and handling the low molecular weight polymer to avoid contamination with ambient moisture or other factors which might affect the stability of the prepolymer system.

In accordance with an alternate method for preparing the urethane prepolymers, where the ethylenically unsaturated monomers do not contain reactive functional groups, and wherein a polyol is employed, the monomers are combined in an amount of about 2 to 90% by weight with 10 to 98% by weight of the polyol and polymerized therein using conventional free radical polymerization procedures in the presence of a chain transfer agent such as dodecyl mercaptan to achieve the low molecular weight polymer dissolved in the polyol. Subsequent to the polymerization of the ethylenically unsaturated monomer(s), the polyisocyanate and any additional ingredients required for the urethane prepolymer forming reaction are added and that reaction is carried out using conventional condensation polymerization procedures. In this manner, the resultant isocyanate terminated urethane prepolymer forms the reactive curing hot melt adhesive described above which contains about 5 to 90% of the urethane prepolymer and 95 to 10% of the low molecular weight polymer.

It is also possible in the case of monomers which do not contain isocyanate reactive functional groups to polymerize the low molecular weight polymer in the presence of the already formed isocyanate terminated urethane prepolymer. This method has the drawback of subjecting the prepolymer to unnecessary heating during the acrylic polymerization, heating that might result in branching, viscosity increase, depletion of needed isocyanate groups and possible gellation. Although these disadvantages are subject to control, more stringent control of conditions are required as compared to polymerization in the non-isocyanate functional urethane components. When the reaction is run in the polyol or other non-isocyanate containing component, there is also the advantage of lower reaction viscosities and reduced exposure to isocyanate vapors because of the lesser amount of heating required.

As discussed previously, the resultant hot melt adhesives which are solid at room temperature have appropriate application viscosities within the range of 3000 to 50,000 cps at 120° C. (which corresponds to about 1500 to 25,000 at 135° C. and 10,000 to about 100,000 at 108° C.) and thus require no additional tackifiers and/or plasticizers in order to achieve these application viscosities. It is noted, however, that small amounts of tackifiers or plasticizers may be added so long as their presence does not serve as a detriment to the desired adhesive properties.

The resulting hot melt adhesive compositions, as described herein above, are typically applied at temperatures of from about 120° F. and a corresponding melt viscosity of from about 3000 to 50,000 centipoises. Coatings having a wet film thickness of from about 5 to 30 mils are ordinarily utilized in preparing.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

The following example illustrates the preparation of an adhesive composition for use herein.

A one liter reaction vessel was set up equipped with a condenser, gas inlet tube, slow addition tube, thermometer, stirrer, and provisions for heating/cooling. The ingredients of the reaction consisted of the following:

| | |
|---|---|
| 1. Polypropylene glycol (1000 mol wt.) | 275.8 gm |
| 2. 1,6-hexane diol, neopentyl glycol adipate (3000 M.W.) | 88.9 gm |

-continued

|   | Ingredient | Amount |
|---|---|---|
| 3. | 1,6-hexane diol, neopentyl glycol adipate (1000 M.W.) | 29.3 gm |
| 4. | Butyl methacrylate | 17.8 gm |
| 5. | Butyl methacrylate | 94.1 gm |
| 6. | Methyl methacrylate | 9.4 gm |
| 7. | Methyl methacrylate | 53.6 gm |
| 8. | Dodecyl mercaptan | 0.68 gm |
| 9. | Benzoyl peroxide | 1.7 gm |
| 10. | Benzoyl peroxide | 0.6 gm |
| 11. | Methylene bis phenyl diisocyanate | 131.1 gm |

The reaction vessel was purged with dry nitrogen and a slow stream of dry nitrogen was bubbled subsurface throughout the reaction. Ingredients designated 1, 2, 3, 4, 6, 8 and 9 were added to the vessel and the temperature raised to 80° C. After ½ hr at 80° C. ingredients 5 and 7 were added uniformly over a period of 1 hr. The reaction was held at 80° C. for an additional three hours, at which time 10 was added. The reaction was held an additional 2 hrs. @80° C. and 11 was added; then the temperature was raised to 100° C. and held for three hours. At this point a vacuum of 120 mm to 130 mm was applied to the vessel for 20 minutes to 30 minutes and the reaction poured hot from the flask.

| Properties | |
|---|---|
| % Methacrylate polymer | 25% |
| Ratio of butyl methacrylate to methyl methacrylate | 64 to 36 |
| % Urethane prepolymer | 75% |
| % isocyanate groups | 1.9% |
| Viscosity at 100° C. | 64,000 cps |
| Viscosity at 120° C. | 25,250 cps |
| Viscosity at RT | Solid |
| Intrinsic Viscosity in tetrahydrofuran/ethanol = 9/1 | 0.18 |
| Color | water white to very slightly amber |
| Clarity | clear to very slightly hazy |
| Calculated urethane prepolymer mol. wt. | 3315 mol. wt. |
| Isocyanate Index | 1.6 |

EXAMPLE II

This example illustrates the addition of a commercially available low molecular weight polymer to the urethane prepolymer to produce a hot melt adhesive. Elvacite 2013 is a 64% butylmethacrylate/36% methylmethacrylate copolymer of I.V. 0.2 available from DuPont. The Elvacite was vacuum dried in a desicator for 24 hours immediately prior to use herein.

| Ingredients | |
|---|---|
| Polypropylene Glycol (2000 Mol. wt.) | 621.0 gm |
| 1,6 hexanediol adipate (3000 Mol. wt.) | 266.5 |
| Elvacite 2013 | 361.0 |
| Methylene bisphenyl diisocyanate | 191.0 |

Procedure

All the ingredients listed above were added to the vessel and heated at 100° C. until the Elvacite was dissolved. After 4 hours at 100° C. the reaction was poured hot from the vessel. The samples had the following properties:

| Properties | |
|---|---|
| % Isocyanate groups | 1.5-2.0% |
| Viscosity at 100° C. | 7000-15000 cps |
| Viscosity at room temp. | Semi-Solid |
| Intrinsic viscosity in THF/ETOH | 0.15-0.25 |
| Color | water white |
| Clarity | slightly hazy |
| Isocyanate Index | 2.0 |

In order to demonstrate the applicability of the hot melt of Example II to cigarette tipping operations, it was subjected to the following test to evaluate the plasticizer resistance of the adhesive.

Plasticizer Migration: The bonds were made by coating a bead of adhesive along the length of the test piece of plus wrap paper and a top piece of the same substrate was placed on the bead and compressed. The bonded piece was left for a period of time (commonly 24 hours) before testing. The bonds were then suspended over a container of plasticizer and sealed. They were then tested over a period of time. For this test, the polyurethane hot melt of the example was compared against conventionally employed ethylene vinyl acetate (EVA) and polyamide hot melt adhesives which are widely regarded as having good plasticizer resistance. The results indicate that polyurethane hot melts of the invention are entirely resistant to plasticizer often found in cigarette tipping applications and are much more reliable than EVA or polyamide hot melts, which may fail after a period of time.

EXAMPLE III

This example describes the synthesis of a fully IPN hot melt adhesive for use as a cigarette tipping adhesive using the basic procedure described in Example I.

| Ingredient | Weight (gms) |
|---|---|
| polypropylene glycol (MW: 2000) | 155.0 |
| 1,6-hexanediol, adipate (MW: 3000) | 66.5 |
| methylene bisphenyl diisocyanate | 44.9 |
| butyl methacrylate | 19.7 |
| methyl methacrylate | 64.3 |
| methylacryloxypropyl trimethoxysilane | 6.0 |
| Dodecyl mercaptan | 0.6 |
| 2,2-azo bis (methyl butyronitrile) | 1.5 |

The sample was prepared following the procedure of Example 1. The properties of the sample were summarized as follows:

| Properties | |
|---|---|
| % isocyanate groups | 1.35% |
| Viscosity at room temperature | solid |
| Intrinsic viscosity in tetrahydrofuran/ethanol | 6.22 dl/g |
| Isocyanate index | 1.85 |

The resulting hot melt adhesive, as well as hot melts prepared from monomers containing other moisture reactive functional groups, may be successfully used to form cigarette filters as described hereinabove. It will be apparent that various changes and modifications may be made in the embodiments of the invention described above, without departing from the scope of the invention, as defined in the appended claims, and it is intended therefore, that all matter contained in the foregoing description shall be interpreted as illustrative only and not as limitative of the invention.

We claim:

1. In a process for manufacturing cigarette filters wherein adhesive is applied to at least one longitudinal edge of the plug wrap paper, a bond is made while the adhesive is molten and the resultant bond is held in compression for sufficient time to prevent bond movement, the improvement which comprises, using as the adhesive, a solvent-free hot melt polyurethane adhesive composition which is solid at room temperature, said adhesive consisting essentially of:
   a) 5 to 90% by weight of a urethane prepolymer having an isocyanate content of 0.25 to 15% and an isocyanate index greater than 1 and no more than about 2;
   b) 10 to 95% by weight of a low molecular weight polymer of ethylenically unsaturated monomers containing no active hydrogen; said hot melt adhesive formulation being characterized, in the absence of tackifiers and/or plasticizers, by a viscosity of 3000 to 50,000 cps. at 120° C.

2. The process of claim 1 wherein the ethylenically unsaturated monomer in the hot melt adhesive is selected from the group consisting of $C_1$ to $C_{12}$ esters of acrylic and methacrylic acid, vinyl esters and ethers, fumarates, maleates, styrene, acrylonitrile, ethylene and mixtures thereof.

3. The process of claim 1 wherein the ethylenically unsaturated monomers in the hot melt adhesive are polymerized to an intrinsic viscosity of 0.1 to 0.4. cps as measured in a 9:1 mixture of tetrahydrofuran and alcohol.

4. The process of claim 1 wherein the urethane prepolymer in the hot melt adhesive is prepared from the condensation polymerization of a polyol and a polyisocyanate.

5. The process of claim 1 wherein the urethane prepolymer in the hot melt adhesive is prepared from the condensation polymerization of a diol and a diisocyanate.

6. The process adhesive of claim 1 wherein the polyisocyanate in the hot melt adhesive is selected from the group consisting of ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene disocyanate, 1-chlorobenzene-2,4-diisocyanate, 4,4',4''-triisocyanatotriphenylmethane, 1,3,5-triisocyanato-benzene, 2,4,6-triisocyanato-toluene and 4,4'-dimethyldiphenylmethane-2,2',5,5-tetraisocyanate.

7. The process of claim 1 wherein the free isocyanate content of the hot melt adhesive is 0.25 to 4%.

* * * * *